No. 626,976. Patented June 13, 1899.
P. B. CURRAN.
LAMP.
(Application filed Jan. 12, 1899.)
(No Model.)
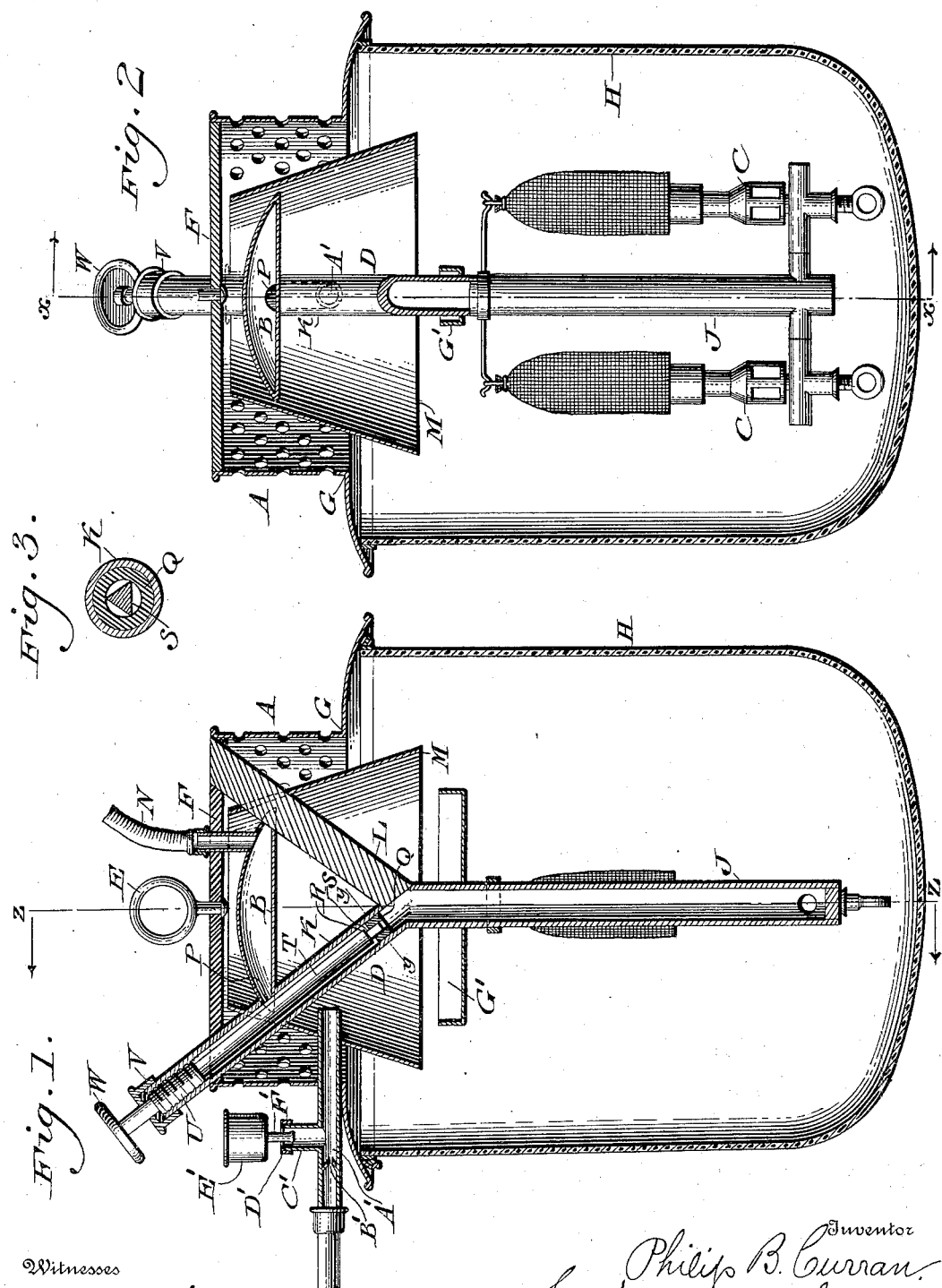
Witnesses
P. F. Angles
L. Douville
Inventor
Philip B. Curran.
by Diedersheim & Fairbanks,
Attorneys
THE NORRIS PETERS CO., PHOTO-LITHO., WASHINGTON, D. C.

UNITED STATES PATENT OFFICE.

PHILIP B. CURRAN, OF PHILADELPHIA, PENNSYLVANIA.

LAMP.

SPECIFICATION forming part of Letters Patent No. 626,976, dated June 13, 1899.

Application filed January 12, 1899. Serial No. 701,894. (No model.)

*To all whom it may concern:*

Be it known that I, PHILIP B. CURRAN, a citizen of the United States, residing in the city and county of Philadelphia, State of Pennsylvania, have invented a new and useful Improvement in Lamps, which improvement is fully set forth in the following specification and accompanying drawings.

This invention consists of an improved construction in a lamp for burning hydrocarbon or other highly-volatile oils, and embodies an oil-chamber under the influence of a burner and constituting a generator and a novel construction and arrangement of thermostatic means also under the influence of the burner and located above the latter to regulate the outflow from the generator, such means being adapted to close the generator-outlet when the heat from the burner is insufficient to generate gas.

It also consists of a novel construction of starting device or auxiliary burner for rendering the lamp initially operative and the novel arrangement thereof relative to the thermostatic valve and its adjuncts.

The invention further consists of the novel details of construction hereinafter fully described, and particularly pointed out in the claims.

Figure 1 represents a central vertical section of a lamp constructed in accordance with this invention and taken on the line $x$ $x$ of Fig. 2. Fig. 2 represents a central vertical section taken at right angles thereto and on the line $z$ $z$ of Fig. 1. Fig. 3 represents a section of a valve on the line $y$ $y$, Fig. 1.

Similar letters of reference indicate corresponding parts in the figures.

Referring to the drawings, A designates the lamp, comprising, essentially, an oil-chamber B, communicating with the burners C, and the thermostatic means D, controlling the communication between the generator-chamber B and said burners. The lamp is suspended by an eye E, secured to the top plate F, from which depends the top frame G, the upper portion thereof being perforated to afford a free circulation of air, while the lower portion is suitably flanged and sustains the globe H. The burners C are carried at the lower end of the central pipe J, which communicates at its upper end with the tube K of the thermostatic regulating means, the same being preferably inclined and passing through the top plate F, to which it is secured. The brace L is connected with the upper end of said pipe and with the plate F.

Situated within the upper portion of the lamp and carried by the top K and brace L is a hood M, open at its ends and shaped like the frustum of a cone. The chamber B is situated below the upper end of this hood M, is mounted upon the brace L and tube K, and is smaller than the hood to afford a passage thereby. The supply-pipe N passes through the top plate F and communicates with said chamber adjacent the brace L or diametrically opposite the tube K, said chamber and tube K also communicating through a port P at the point where the former is secured upon the latter. The said chamber B is preferably provided with a flat bottom and a dome-shaped top.

At the lower end of the tube K is a valve-seat Q to receive a valve R, whose stem S passes through an opening therein. Said valve R is carried by a bar T, that passes upwardly and through the end of the tube. The bar T is adjustable longitudinally within the tube conveniently by means of its screw-threaded upper end U, while the cap V and a suitable packing furnish a tight joint between the tube and bar. The bar can of course have the finger-piece W, by which it is turned.

It will be apparent that the thermostatic devices extend partly within and partly without the hood of the burner, whereby said devices are rendered readily accessible.

In practice I propose to construct the bar T and tube K of materials whose coefficients of expansion vary—for instance, the tube K of copper and the bar T of steel—whereby the tube expands to a greater extent than the bar. The bar and valve are adjusted so that under normal temperature the latter is seated, and thus when heat is applied to the tube K said tube expands to a greater extent than the bar T, unseats the valve, and establishes communication between said tube K and the burners.

It will be apparent that by locating the thermostatic device above the burner the action of the heat is more effective thereupon than in other structures where the thermostatic devices are located below the burner.

For the preliminary generation of gas I provide a starting device or auxiliary burner to act upon the tube K and the generator, and which consists of a tube A' extending through the top frame G and ending adjacent to the tube K, whereby the flame therefrom impinges against said tube and against the bottom of the generator. The tube A' may communicate with a gas-supply and is provided interiorly with the nozzle or tip B', and also with the lateral branch C', communicating with the atmosphere, so as to constitute a Bunsen burner. The lateral branch C' is upright and is provided with a movable perforated cap D', carrying a cup E', having an outlet-nipple F' passing through the cap. Mounted upon the pipe J is a tray or pan G', one end of which is situated below the inner end of the tube A', whereby said pan is adapted to receive the droppings from said tube, and thus prevent the same from falling to the bottom of the globe H.

The operation is as follows: It is understood that under normal conditions the valve R is seated and closes the communication between the generator and the burners. In lighting the lamp the flame from the starting device or tube A' is used, which, impinging upon the tube K and the bottom of the chamber R, not only heats the oil therein sufficiently to generate the gas but unseats the valve, it being understood, however, that the supply of oil to the generator may be controlled by hand in the first instance. The starting-flame used may be the ordinary Bunsen flame where a gas-supply is convenient, or alcohol may be placed within the cup E' and the dripping from the nipple F' thereof lighted before the cap is replaced, whereby it is seen that the alcohol passing through the tube A' and into the tray or pan G' serves to heat the tube K and chamber B. The gas passes through the tube K and pipe J to the burners and the heat from the latter generates the gas, it being noted that by reason of the hood N the heated products of combustion are directed against the bottom of the chamber B and said tube K. As long as gas is being generated and the burners in operation the valve remains unseated; but it is seen that should one of the burners or the burner where one is used become clogged or inoperative, whereby its flame is reduced or extinguished, it would consequently cease to generate gas, and the valve R is then closed, since the heat is withdrawn from the tube K. The device therefore acts automatically, for when there is sufficient heat to generate gas the valve is opened, but closed whenever gas is not being generated.

Having thus described my invention, what I claim as new, and desire to secure by Letters Patent, is—

1. In a lamp, a burner, and a generator-chamber communicating therewith and located above said burner so as to be heated thereby, the pipe leading from said generator-chamber downwardly to said burner having a thermostatic device therein which is controlled by variations of heat from said burner, said thermostatic device being located above said burner.

2. In a lamp, a burner, a generator-chamber located above the latter and communicating therewith, thermostatic devices actuating a valve which controls the communication between said chamber and burner, and an auxiliary burner located in proximity to said devices.

3. In a lamp, a burner, a hood situated above the same, a generator-chamber situated within said hood and communicating with the burner, and thermostatic devices above said burner controlling the communication between said generator-chamber and said burner, said thermostatic devices being situated partly within and partly without said hood.

4. In a lamp, a burner, a generator-chamber situated above the same, a pipe leading from said generator-chamber and communicating with the burner, said pipe being situated above the burner, a valve-seat within said pipe intermediate said burner and chamber, a valve, and a bar connected with said pipe and carrying said valve, said pipe and bar having different coefficients of expansion.

5. In a lamp, a burner, a generator-chamber situated above the same, a pipe leading from said generator-chamber and communicating with the burner, said pipe being situated above the burner, a valve-seat within said pipe, a valve, and a bar adjustably connected with said pipe and carrying said valve, said pipe and bar having different coefficients of expansion.

6. In a lamp, a burner, a hood situated above said burner and near the top of the lamp-frame and open at its ends, a generator-chamber situated within said hood and communicating with said burner, passages between said generator-chamber and hood, and thermostatic devices controlling the communication between said generator-chamber and burner and heated by said burner.

7. In a lamp, a burner, a generator-chamber communicating therewith, thermostatic devices controlling the communication between said generator-chamber and burner, and an auxiliary burner adapted to heat said generator-chamber and said thermostatic devices.

8. In a lamp, a burner, a generator-chamber communicating therewith, thermostatic devices controlling the communication between said generator-chamber and burner, a pan or tray situated below said generator-chamber and thermostatic devices, and auxiliary means for supplying an inflammable fluid thereto.

9. In a lamp, a burner, a generator-chamber communicating therewith, thermostatic devices controlling the communication between said generator-chamber and burner, a pan or tray situated below said generator-chamber and thermostatic devices, an auxiliary burner having its nozzle situated adjacent said thermostatic devices and generator-chamber and over said pan or tray, and a cup or reservoir communicating with said nozzle.

10. In a lamp, a burner, a generator-chamber communicating therewith, thermostatic devices controlling the communication between said generator-chamber and burner, a pan or tray situated below said generator-chamber and thermostatic devices, an auxiliary burner having its nozzle situated adjacent said thermostatic devices and generator-chamber and over said pan or tray, an upright branch upon said nozzle, a removable perforated cap upon the upper end of said branch, and a reservoir or cup carried by said cap and having a nipple situated within said branch.

11. In a lamp, a burner, a generator-chamber communicating therewith, thermostatic devices controlling the communication between said chamber and burner, a pan or tray below said chamber, and an auxiliary or starting burner located in proximity to said devices and above said tray.

PHILIP B. CURRAN.

Witnesses:
WM. C. WIEDERSHEIM,
E. HAYWARD FAIRBANKS.